Oct. 30, 1962     A. FUMEAUX     3,060,637
METHOD AND MEANS FOR RETARDING THE BUDDING
AND BLOSSOMING OF PLANTS
Filed Jan. 26, 1960

INVENTOR.
ANGELIN FUMEAUX
BY
ATTORNEY.

United States Patent Office 3,060,637
Patented Oct. 30, 1962

3,060,637
METHOD AND MEANS FOR RETARDING THE BUDDING AND BLOSSOMING OF PLANTS
Angelin Fumeaux, Plan-Conthey, Switzerland, assignor to Societe Anonyme: Ethylene-Plastique, Paris, France, a French society
Filed Jan. 26, 1960, Ser. No. 4,723
Claims priority, application Switzerland Jan. 28, 1959
3 Claims. (Cl. 47—1)

This invention relates generally to plant growth control. In the cultivation of fruit trees, vines, and ornamental and other plants, it is in many cases desirable to retard the development of buds and blossoms of individual plants as for the purpose of averting damage by spring frosts, as well as controlling the time of harvesting.

It is an object of this invention to provide an improved method and means for selectively retarding the budding and blossoming of plants that will be reliable, selective and innocuous to the plant.

The invention is based on the finding that the growth of a bud may be retarded for any reasonable period of time, without impairing its ultimate development, by subjecting the bud to a gentle and uniform mechanical pressure. When the pressure is released the bud proceeds with its normal development. The invention provides improved means for retarding the development of plant buds, comprising a spring clamp device having means for closely surrounding a substantial part of the other surface of a bud and including an element of yieldable material for engaging such surface so as to transmit the clamping pressure thereto in a gentle and uniform manner.

Figure 1:
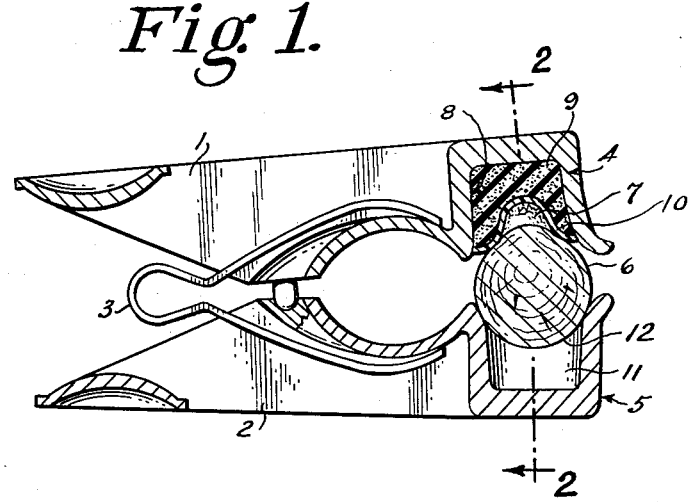
Figure 2:
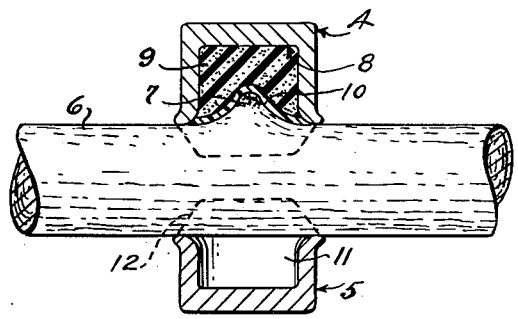

An exemplary embodiment of means according to the invention for retarding the growth of plant buds will now be described with reference to the accompanying drawings, wherein FIG. 1 is a side view, partly in section of the device positioned on a vine-shoot; and FIG. 2 is a cross section on line 2—2 of FIG. 1.

The device in the form illustrated is a spring clamp generally resembling a clothes-pin and including a pair of hinged arms 1 and 2 and a leaf spring 3 urging the arms to a position of mutual engagement. The ends 4 and 5 of the arms 1 and 2 that are urged into engagement by the spring are formed with facing recesses 8 and 11 respectively, having somewhat diverging, preferably rounded, edges as shown. One of the end portions, i.e. the end portion 4 of the upper arm 1 as here shown, is partly filled with a soft, flexible somewhat resilient material 9, such as foam rubber or a suitable foam plastic. This filling 9 is preferably retained and limited by a flexible membrane 10, e.g. sheet rubber or plastic. As shown, the foam filling and its coating membrane 10 define a cushioning means having a flexible outer surface. The end portion 5 of the opposite arm 2 has its recess 11 defined by arcuate, concave side edges 12. The recess 11 may be left free of any filling.

In use, the device is engaged around a branch or shoot 6, e.g. a vine-shoot, upon which a bud or eye 7 is situated, and is turned in such a manner that the cushion 9 fits snugly around the bud while the opposite recess 11 engages the branch or stem 6 on the side remote from the bud. Owing to the arcuate concave form of the edges 12 of the recess 11 which generally corresponds to the average curvature of the branch, stem, or shoot, the clamp will be held in position in a positive and reliable manner for all practical purposes. The flexible membrane 10 overlying the cushioning means 9 will transmit the spring pressure to substantially the entire surface of the bud in a uniform and gentle manner which will not be liable to damage the bud but will effectively prevent its further development so long as it is retained in place. It has been found that in the absence of the precautions shown, whereby substantially the whole surface of the bud is subjected to uniform pressure, the bud in its growth will tend to creep through any aperture presented to it, as between the edge of the clamp and the branch, and the desired effect will not be achieved. Also, in the absence of the soft cushioning means shown, excessive pressures may be applied to certain points of the bud surface, whereby the bud may be permanently damaged and its subsequent development prevented or impaired.

However, the applicant has found after extensive experimentation that provided the precautions herein described are taken, the budding or sprouting process will be completely suspended so long as the pressure is maintained, but that such process will immediately resume in a normal manner and proceed to its natural end—flowering and fructification—on removal of such pressure.

The precise value of the pressure that will be operative for the purposes of the invention is not especially critical. It has been found with vine buds, that excellent results are had when using spring clamps of a type that will apply a total force greater than about 1 kilogram over the entire surface of the average vine bud, e.g. a force of about 1.5 kg.

The clamping means of the invention are preferably positioned in the very first days of sprouting and before the buds have developed to any substantial extent. They may be removed at any suitable time e.g. after all danger of frost has passed. It has been found that not only is the budding process normally resumed on removal of the pressure means of the invention, but that it then proceeds at an accelerated rate so that the retarded buds rapidly catch up in development with control buds not subjected to the means of the invention. Moreover, the fruit resulting from the retarded buds are found to be better shaped and developed and to ripen better than those from control buds. This is consistent with the principle that delayed flowering is conducive to better fructification.

Experiments in the field of vine growing have shown that budding control, as described above, not only averts damage from spring frost, but also prevents other types of mishaps to which the vines are prone, such as abortion due to washing away of the pollen by spring rains, premature and/or incomplete fertilization, and the like incidents, well-known in the vine-growing art, thereby greatly enhancing the probability of a good harvest.

While the invention has been described with especial emphasis on its services to vine-growing, it will be realized that it is equally applicable to the farming of other plants, especially fruit trees and ornamental plants. A special advantage of the method as applied to ornamental flower-bearing plants is the possibility thereby made available of retarding the growth of the flower buds as long as desired, so that the flowering can be spread out at intervals throughout an extensive period of the year.

The pressure-applying device or clamp according to the invention may of course be constructed in various forms departing in various ways from the specific embodiment illustrated and described, which was especially designed for applying the invention to vines. For other plants the relative sizes and shapes of the components of the clamp may vary from those shown. Furthermore, the clamp might be made in one piece; the separate spring shown might be omitted and instead the inherent resiliency of the material may be used for developing the requisite pressure. Various other modifications may be conceived within the scope of the present invention depending on individual uses, species of plant, and the like.

What I claim is:
1. The method of controlling the development of plant buds and of avoiding frost damage to the latter, compris- ing applying a gentle uniform pressure to substantially the entire outer surface of an incipient bud through an elastic, heat insulating member in contact with the latter during a predetermined period of time so as to uniformly retard development of said bud and protect the latter against frost, and then removing said member so as to relax the pressure and thereby permit resumption of the normal growth of the bud when the possibility of frost damage thereto no longer exists.

2. A device for retarding the development of plant buds while protecting the latter against frost comprising a pair of cooperating jaw members and force developing means yieldably urging said jaw members towards each other, at least one of said jaw members having a recess opening toward the other of said jaw members, a body of resilient, heat insulating foam material in said recess to fit snugly over a bud on a plant branch disposed between said jaw members and to yieldably transmit the force to substantially the full surface of the bud while insulating the latter against the effects of frost, said other jaw member being concave toward said one jaw member so as to conform closely to the side of the plant branch opposed to the bud.

3. A device as in claim 2; wherein said body of resilient, heat insulating foam material has a resiliently flexible membrane at the surface thereof facing toward said other jaw member for ensuring equal distribution of pressure to the uneven surface of a bud on a plant branch disposed between the jaw members.

References Cited in the file of this patent

UNITED STATES PATENTS

| | | |
|---|---|---|
| 1,213,392 | Maloney | Jan. 23, 1917 |
| 1,869,607 | Merrill | Aug. 2, 1932 |
| 2,039,620 | Bear | May 5, 1936 |
| 2,205,524 | Gareis | June 25, 1940 |
| 2,766,500 | Chanko | Oct. 16, 1956 |
| 2,844,913 | Brill | July 29, 1958 |
| 2,916,852 | Fleischhauer | Dec. 15, 1959 |

FOREIGN PATENTS

| | | |
|---|---|---|
| 74,219 | Austria | Mar. 11, 1918 |
| 428,940 | France | July 3, 1911 |
| 632,315 | France | Oct. 1, 1927 |
| 9,200 | Germany | Apr. 1, 1880 |
| 560,404 | Germany | Oct. 1, 1932 |
| 74,296 | Hungary | June 17, 1919 |

OTHER REFERENCES

"Grafting and Budding" (Baltet), published by Crosby Lockwood & Co. (London, England), 1882. Pages 45, 56, 47, 214, 215, 216 relied on.